United States Patent [19]

Rosenberg et al.

[11] 4,092,109
[45] May 30, 1978

[54] METHOD FOR CORROSION INHIBITION OF REINFORCED BRIDGE STRUCTURES

[75] Inventors: Arnold Morry Rosenberg, Potomac; James Michael Gaidis, Ellicott City, both of Md.

[73] Assignee: W. R. Grace & Co., New York, N.Y.

[21] Appl. No.: 700,343

[22] Filed: June 28, 1976

[51] Int. Cl.² ............ C23F 11/04; C23F 11/08; C23F 9/02; C09K 3/18

[52] U.S. Cl. .................... 21/2.5 R; 134/5; 134/42; 252/70; 252/387

[58] Field of Search ........... 134/5, 42; 21/2.5 R; 252/70, 387

[56] References Cited

U.S. PATENT DOCUMENTS

| | | | |
|---|---|---|---|
| 3,210,207 | 10/1965 | Dodson et al. | 106/90 |
| 3,227,654 | 1/1966 | Standish et al. | 252/70 |
| 3,297,577 | 1/1967 | Standish et al. | 252/70 |
| 3,384,590 | 5/1968 | Eversole et al. | 252/70 |
| 3,427,175 | 2/1969 | Angstadt et al. | 106/89 |
| 3,801,338 | 4/1974 | Whittaker | 106/90 |
| 3,980,487 | 9/1976 | Akabayoshi et al. | 106/111 |

FOREIGN PATENT DOCUMENTS

| | | | |
|---|---|---|---|
| 754,074 | 3/1967 | Canada | 252/70 |
| 272,462 | 9/1970 | U.S.S.R. | 252/70 |

*Primary Examiner*—Barry S. Richman
*Attorney, Agent, or Firm*—Charles L. Harness; Mark T. Collins; Howard J. Troffkin

[57] ABSTRACT

A method of use of calcium nitrite in corrosion control in hydraulic cements that contain metal pieces or structures, and in certain related uses, e.g., snow removal from alite cement bridge decking.

2 Claims, 1 Drawing Figure

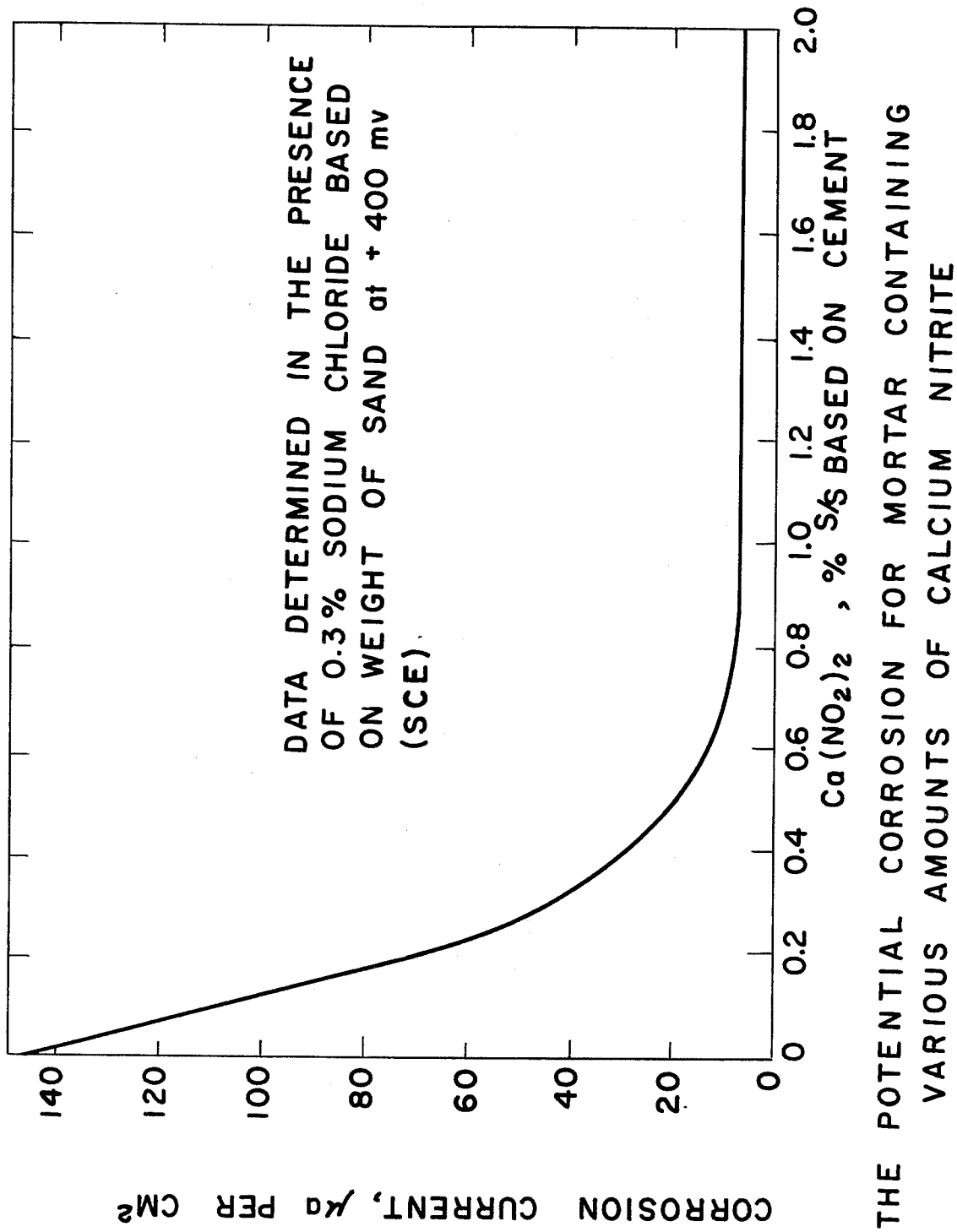

METHOD FOR CORROSION INHIBITION OF REINFORCED BRIDGE STRUCTURES

This invention is directed to the use of calcium nitrite in hydraulic cements (including alite cements) that contain metal pieces or structures (e.g., reinforcing bars, grids, girders, channel beams, and the like), in a corrosive environment of a certain type. The corrosive environment can result from ions such as sulfate or carbonate, or from sodium chloride, in contact with the metal. The sodium chloride may be present by virtue of the use of marine sand aggregate. The presence of the calcium nitrite inhibits corrosion of the metal pieces. The metal can be iron, steel, aluminum, or aluminum-steel alloy. The invention includes exterior application of calcium nitrite to hydraulic cement structures and in related corrosion control fields, e.g., snow removal.

Use in Alite Cement

The binder component in the cements, mortars and concretes used widely as a construction material is portland cement. Portland cement is manufactured by calcining a mixture of limestone and clay to form a clinker, and by grinding the clinker to a fine powder. The major compounds found in portland cement are tricalcium silicate, dicalcium silicate, tricalcium aluminate, and tetracalcium aluminoferrite. The tricalcium and dicalcium silicates are thought to be the principal bonding constituents in the portland cement. Tricalcium silicate, when mixed with water, forms a calcium silicate hydrate known as tobermorite gel and calcium hydroxide. The dicalcium silicate, when contacted with water, forms similar products but at a much lower rate of reaction. The tricalcium silicate, having the greater rate of reaction determines, to a large extent, the hardening rate of the cement. To provide materials which are suitable for different uses, portland cements having a range of hardening rates have been found desirable. By producing cements having a range of proportions of tricalcium silicate present, a range of hardening rates and strength development has been obtained. Four general types of portland cements, varying principally in the relative quantities of tricalcium silicate and dicalcium silicate present therein, are commonly produced. The proportions of the principal compounds present in each type of cement are shown in Table I.

TABLE I

| Cement type | I | II | III | IV |
|---|---|---|---|---|
| Compositon, wt. percent: | | | | |
| Tricalcium silicate | 53 | 47 | 58 | 26 |
| Dicalcium silicate | 24 | 32 | 16 | 54 |
| Tricalcium aluminate | 8 | 3 | 8 | 2 |
| Tetracalcium aluminoferrite | 8 | 12 | 8 | 12 |

The term "alite cement" is defined as including neat pastes, mortars, and concretes and the mixed, dry unreacted ingredients of neat pastes, mortars, and concretes, comprising as alite cement binder, a composition containing greater than 20 percent tricalcium silicate based on the dry weight of the composition. The most common alite cements are portland cements, and mortars and concretes containing portland cements. Most commercially available alite cements contain binders comprising from about 20 to 75 percent tricalcium silicate. The alite cement binder, or concrete binder, is the component which provides the desired bonding, for example, portland cement.

The calcium nitrite can be added to the hydraulic (including alite) cement by various techniques. Calcium nitrite can be added to cement clinker prior to grinding and can be thoroughly mixed with the cement component during the grinding step. The calcium nitrite can also be added to the binder cement powder as a dry powder, slurry, or water solution, and the ingredients can be thoroughly mixed to uniformly disperse the active ingredients. The calcium nitrite can be dissolved in the water with which the binder is mixed to form a hardening composition. The cement binder can be pre-mixed with water and then mixed or contacted with the calcium nitrite.

THE PRIOR ART

The use of sodium nitrite with marine sands in cements is known. See Japanese patent, Publication No. 33-940, published Feb. 15, 1958, application Serial No. 30-33777, filed Dec. 27, 1955, Kano et al. This patent teaches, inter alia, that sodium nitrite is effective in inhibiting corrosion of cement and concrete in which are imbedded reinforcing iron and steel bars and frames, using an aggregate, sea sand. The instant invention is directed to the use of calcium nitrite in a similar application. Calcium nitrite has several advantages over sodium nitrite. (1) Calcium ion forms a carbonate, which eventually forms a cathodic protection coating on the metal. (2) Set time with sodium nitrite is variable. Set time with calcium nitrite is uniformly accelerated. (3) Sodium nitrite reduces compressive strength; with calcium nitrite it is increased. (4) Sodium salts effloresce on brick work and the like; calcium nitrite does not. (5) Sodium salts induce alkali-aggregate reaction, which is to say, large amounts of alkalis will cause expansive reaction and break up the concrete. Calcium nitrite reduces such tendency as compared to sodium salts.

U.S. Pat. No. 3,427,175, Angstadt et al, discloses the use of calcium nitrite as an accelerator which inhibits corrosion in alite cements. The calcium nitrite may contain minor amounts of sodium nitrite and may be used with calcium chloride and other accelerators.

U.S. Pat. No. 3,210,207, Dodson et al, teaches the use of mixes of calcium formate and minor amounts of certain nitrite salts as corrosion inhibitors, to be used as accelerators in cements. The embedded metal to be protected can be steel, aluminum, or zinc. The inventors consider that the inhibitor forms a protecting coating on the metal.

U.S. Pat. No. 3,801,338, Whitaker, teaches the use of a mixture of calcium formate and sodium nitrite for adding to cement which is to contain metal reinforcement. Improved compressive strength is taught, together with sulfate resistance and corrosion inhibition.

The herein examples illustrate without limiting the invention.

EXAMPLE 1

Marine Sands Plus Calcium Nitrite

In order to demonstrate the utility of calcium nitrite in inhibiting corrosion in a hydraulic cement prepared as a mortar with marine sands, the following was done.

Mortar mix was prepared (as described in ASTM C-185 of June 1970). This mix contains hydraulic cement plus "standard sand," in the ratio of 350 g. cement to 1400 g. sand. In order to simulate a mortar mix containing marine sand, to the C-185 mix was added 0.3% sodium chloride by weight of the sand. This amount of sodium chloride is approximately the content of sodium chloride in marine sand. The sodium chloride in this case was added to the mortar mix along with the mixing water (i.e., as an aqueous solution of NaCl). This was done in a Hobart mixer.

Next the resulting mortar mix was poured into previously prepared forms. These forms comprised plastic bottles about 3 inches tall by 1⅜ inches diameter. A number of forms were used. Each form was filled to within a fraction of an inch of the top with fresh mortar mix as above prepared. Next a specimen of reinforcing rod, previously sandblasted to completely clean it, was inserted nearly to the bottom of the mortar. The bottom tip of the rod specimen was sealed with a wax cap to eliminate edge effects in determining corrosion current per square centimeter. The overall length of the rod was about 6 inches. The rod diameter was about ¼ inch.

Preferred embodiments thus include (A) a composition of matter comprising portland cement, marine sand, and 0.25–10% calcium nitrite based on the dry weight of the portland cement; and (B) composition like (A), in which the sand contains about 0.3 wt. % NaCl, and the calcium nitrite is about 2%.

The mortar was permitted to cure for 24 hours at 100% relative humidity, 74° F. temperature ± 3°. The samples were then demolded, placed in saturated lime water, and the corrosion currents were determined at a potential of 400 millivolts.

This general procedure was used to provide the data given in the FIGURE. In assessing this data, the conventional test was used that the more current developed, the greater the corrosion, because it is a well known fact that corrosion is an electrochemical phenomenon. As shown in the chart, current decreased with increasing calcium nitrite, up to a limiting amount of approximately 0.8%. Thereafter increasing the amount of calcium nitrite had no apparent effect on corrosion current, and therefore, by implication, did not reduce corrosion further.

Referring again to the FIGURE, it will be noted that the use of even very small amounts of calcium nitrite improve corrosion resistance. Hence it is intended that the spirit and scope of this invention include any positive amount of calcium nitrite as inhibiting corrosion in the presence of marine sands or the like (i.e., sands or like aggregate containing sodium chloride).

Based on the above described work with sodium chloride, it is our information and belief that calcium nitrite also inhibits corrosion of environments containing substantial amounts of chlorides regardless of the associated cation, and also inhibits corrosion of environments containing substantial amounts of other salts, such as those containing sulfates.

Use on Bridge Decking and Highways

Bridge decking tends to deteriorate because chloride, either as sodium chloride or calcium chloride tends to penetrate into the concrete and in contact with the steel reinforcing rods. The rods are fixed in the concrete at some predetermined depth, and this may be typically 2 to 6 inches. The corrosion problem is encountered in such bridges in many areas of the country. The problem occurs particularly in the north, in areas of snow and ice. In snow/ice removal or counteraction, calcium chloride is frequently spread on the bridges to melt the snow and/or to control deposits of ice. However, the problem is by no means limited to the northern areas of the country. For example, bridges exposed to salt air, particularly those along the coast and on coastal islands, may encounter this problem with particular severity. In the marine cases, of course, the chloride comes from sodium chloride, and may be introduced in the way of spray, or by actual contact by wave action.

This problem is sometimes countered by what is known as cathodic protection. Using this procedure, an electric current is passed through the bridge, using the steel rods as the cathode, and an electrode connected to the surrounding concrete matrix as the anode.

A composition specially affixed on a bridge deck often comprises a coke breeze. This is spread on top of the bridge decking and as it deteriorates it is replaced. In this way the steel rods are preserved, at least to some extent, and the anode, the coke breeze, has to be replaced.

There are, of course, many other methods of cathodic protection, as well as numerous variations on the theme of corrosion control for bridges.

The following example illustrates without limiting the invention.

EXAMPLE 2

To make the following test we used the method of Spellman and Stratfull. This basically involves making up a sample of cement in which there is imbedded a specimen of steel rod, curing the specimen at 100% relative humidity, and then drying out the sample in an oven, thereby to provide a thoroughly dried and porous sample. This sample is then ready to be soaked in sodium chloride solution following the Spellman and Stratfull system, and corrosion measurements can then be made by way of measuring the open circuit potential.

Referring now to Table II, it will be noted that there are four columns, Calcium Nitrite, Sodium Chloride, Previous Drying Time, and Open Circuit Potential. The calcium nitrite was used in varying amounts from 0 to 4%, this is the amount admixed into the cement. Sodium chloride shows the amount (always 0.3%) admixed into the cement and this weight is based on the weight of the sand. As regards previous drying time, two values were used—zero drying time and 4 days. Obviously the 4 days drying time gave a very porous product, with a much greater potential for corrosion than if the sample had not been dried at all. This shows in the fourth column. It will be further noted that as the amount of calcium nitrite in the cement reached values of the order of 2%, even with 0.3% sodium chloride in the mortar (based on sand), acceptable corrosion values as evidenced by open circuit potential were obtained. Of course, leaving out sodium chloride in the sand, excellent values were obtained using fairly small amounts of calcium nitrite, as shown in the last four lines of the table.

TABLE II

The Partial Immersion Corrosion Test

| Calcium Nitrite (% s/s cement) | Sodium Chloride (% s/s sand) | Previous Drying Time (days) | Open Circuit Potential[1] After 2 Weeks (millivolts) |
|---|---|---|---|
| — | — | 4 | 552 |
| — | — | — | 222 |
| — | 0.3 | 4 | 435 |
| — | 0.3 | — | 335 |
| 0.5 | 0.3 | 4 | 430 |
| 0.5 | 0.3 | — | 309 |
| 1.0 | 0.3 | 4 | 300 |
| 1.0 | 0.3 | — | 289 |
| 2.0 | 0.3 | 4 | 302 |
| 2.0 | 0.3 | — | 204 |
| 0.5 | — | 4 | 188 [2][3] |

TABLE II-continued

The Partial Immersion Corrosion Test

| Calcium Nitrite (% s/s cement) | Sodium Chloride (% s/s sand) | Previous Drying Time (days) | Open Circuit Potential[1] After 2 Weeks (millivolts) |
| --- | --- | --- | --- |
| 1.0 | — | 4 | 183 [2] |
| 2.0 | — | 4 | 170 [2] |
| 4.0 | — | 4 | 132 [2] |

[1] These are corrosion potential values determined negative to the Standard Calomel Electrode.
[2] Data determined at the end of ten days.
[3] One value in this group of three samples was 450 millivolts. It was not used to determine average.

Based on our work as reported above, it is our information and belief that bridge decking can be protected as regards corrosion inhibition by application of calcium nitrite exteriorly to the decking. For example, aqueous solutions of calcium nitrite, e.g., 25%, can be applied directly to the bridge decking. In addition calcium nitrite can be applied instead of calcium chloride for snow control purposes directly to the bridge decking. In this connection we bear in mind that whereas calcium chloride is a danger to grass and vegetation around the bridge, calcium nitrite actually provides fertilizer value on account of its nitrogen content.

Also a similar application is the direct application of calcium nitrite, especially in aqueous solution, to junctures of steel structures where they are imbedded in concrete. The juncture area, on being coated with calcium nitrite, tends to protect to the extent of the contact, against any corrosion effect that might be evidenced by chloride contact.

We recommend use of calcium nitrite in the control and/or removal of snow and ice on highways, bridges, and the like at the rate of 1-50 tons (preferably 10-20 tons) per two-lane mile.

ASSOCIATED SYSTEMS OF CORROSION CONTROL

It is our information and belief that calcium nitrite can be used in association with many standard systems of corrosion control, including powder epoxy coatings; polymer-impregnated concrete; waterproof membranes; dense concrete, low water-cement ratio and superplasticizers; integral addition of wax beads; expansive cements; fly ash, latex modified mortar topping; inorganic polymer addition; and polymer concrete. (Examples of suitable latices for latex modified mortar topping are acrylic, polyvinyl acetate, polyvinyl alcohol, vinylidene chloride, styrene-butadiene, and copolymers of these).

Mixtures

It is our information and belief that any of the above mentioned systems should work quite well in concert with the calcium nitrite corrosion inhibitor. However, special mention should be made of certain of these. The first case is methods of treating concrete that would reduce the water permeability. In these cases a harsh mix with a low water/cement ratio would tend to make the calcium nitrite more effective. However, because of the placing difficulties with a harsh mix an admixture could be used to reduce the water and maintain the same plasticity of the mix. In these cases a plasticizer could be used such as copolymers of naphthalene formaldehyde resins or the more normally used water reducing agents such as 80% calcium lignosulfonate and 20% triethylamine added at an addition rate of 0.1 to 0.4 percent s/s cement.

Calcium Nitrite Used with Water Reducing Agents

A water reducing agent is a material added to cement during the manufacture of the concrete to improve the placeability or workability of the mix which allows normal hardening of the concrete to take place, which eventually produces 28-day strengths that are at least 10% stronger than the mix not containing the admixture. Generally a reducing agent causes 5% or greater reduction of water in the mix. Water reducing agents are described in ASTM C-494.

A preferred formulation using calcium nitrite involves a water reducing agent. There are at least two reasons for this. In the first place an ordinary mix using a corrosion inhibitor may tend to form large random bubbles against reinforcing rods during placement of the concrete or cement. Our experimental work shows that the surface of the reinforcing rod exposed to such large random bubbles shows aggravated corrosion, as compared to surfaces of the rod not in contact with such bubbles. In the second place the use of such water reducing agents results in the formation of a more dense cement or concrete, and in consequence reduces ingress of corrosive salts from the environment.

A preferred water reducing agent is 80% calcium lignosulfonate and 20% calcium chloride added at an addition rate of 0.1 to 0.4 percent. Other water reducing agents include additives such as triethylamine formate or polysaccharides.

Calcium Nitrite Used with Retarders

As is known in the cement art, sodium gluconate, calcium lignosulfonate, saccharide type materials and the like, have a known characteristic of improving the placeability and strength as well as retarding the set of the concrete mix. Hence simply by the use of any of the standard retarders, it is our information and belief that the corrosion control properties of calcium nitrite should be enhanced.

It is also known that calcium nitrite is an accelerator. Hence, for control of the mix, a retarder will ordinarily be used. However, in the case that a very rapidly setting mix is desired, the retarder can be omitted. Retarders are generally added at 0.05 to 0.4% based on solid cement.

Air Entraining Agents with Calcium Nitrite

The major reason for adding calcium nitrite in bridge construction is to improve the durability of the bridge deck. Air entraining agents are also added to concrete during bridge construction to improve durability. They work by providing small expansion chambers within the concrete mix such that when water freezes within the concrete, concrete does not spall and crack. When calcium nitrite and an air entraining agent are used it is our information and belief that the mean free path for the introduction of chloride into the concrete is kept to a maximum, reducing the chloride concentration at the surface of the reinforcing bar, thereby making less nitrite necessary and the use of the combination more economical.

As an air entraining agent Vinsol Resin sold commercially by Hercules Powder Co. is recommended. This material is of the family of wood rosins. Also suitable are saponified tall oil resins and sodium lauryl sulfonate (this being an anionic surfactant) and "TRITON X-100"

(this being a nonyl phenol ethylene oxide condensate, a nonionic surfactant).

Accelerators Used with Calcium Nitrite

It is our information and belief that calcium nitrite can be used together with other accelerators in any of the formations herein described. Such accelerators are well known to those skilled in the cement and concrete art and are listed in standard texts on this subject.

Use of Pozzolans with Calcium Nitrite

It is our information and belief that these materials, whether natural or artificial (e.g., fly ash, blast furnace slag, and the like) are useful with calcium nitrite formulations in that these added materials fill up voids in the concrete and/or cement mix, thereby reducing the amount of calcium nitrite required for equivalent corrosion control. A concrete mix containing 20% of the cement replaced by fly ash and 1.5% calcium nitrite by weight of cement may be used. The other constituents in the concrete mix are unchanged except that this mix will require cold water because of the added pozzolans.

Except for Examples 1 and 2, all statements herein are made on information and belief.

What is claimed is:

1. The method of protecting metal structures in hydraulic cement bridge decking against corrosion comprising applying an agent consisting calcium nitrite to the bridge decking.

2. The method of protecting metal structures in hydraulic cement bridge decking against corrosion comprising applying an agent consisting of calcium nitrite to the juncture of the metal structure with the bridge decking.

* * * * *